United States Patent [19]

Tonomura

[11] Patent Number: 4,902,033
[45] Date of Patent: Feb. 20, 1990

[54] DOUBLE WISHBONE REAR SUSPENSION

[75] Inventor: Hiroshi Tonomura, Yokosuka, Japan

[73] Assignee: Nissan Motor Co., Ltd., Japan

[21] Appl. No.: 211,044

[22] Filed: Jun. 24, 1988

[30] Foreign Application Priority Data

Jun. 26, 1987 [JP] Japan .................................. 62-157938

[51] Int. Cl.$^4$ .............................................. B60G 3/20
[52] U.S. Cl. .................................... 280/690; 280/689; 280/701
[58] Field of Search ............... 280/690, 701, 696, 697, 280/698, 700, 675, 688, 660, 663, 665, 666, 670, 672, 673

[56] References Cited

U.S. PATENT DOCUMENTS

| 3,075,786 | 1/1963 | Freers et al. | 280/666 |
| 3,804,433 | 4/1974 | Scherenberg et al. | 280/701 |
| 3,881,741 | 5/1975 | Müller | 280/696 |
| 4,313,619 | 2/1982 | Hailer | 280/675 |
| 4,457,537 | 7/1984 | von der Ohe et al. | 280/675 |
| 4,545,602 | 10/1985 | Shibahata | 280/701 |

FOREIGN PATENT DOCUMENTS

| 1362196 | 4/1964 | France | 280/675 |
| 51-20765 | 6/1976 | Japan . | |
| 52-9889 | 3/1977 | Japan . | |
| 61-263809 | 11/1986 | Japan | 280/701 |
| 61-263810 | 11/1986 | Japan | 280/701 |
| 61-263811 | 11/1986 | Japan | 280/701 |
| 61-263812 | 11/1986 | Japan | 280/701 |
| 390699 | 8/1965 | Switzerland . | |

OTHER PUBLICATIONS

J. Reimpell, "Fahrwerktechnik 1" pp. 350–351.

Primary Examiner—Charles A. Marmor
Assistant Examiner—Karin Tyson
Attorney, Agent, or Firm—Leydig, Voit & Mayer

[57] ABSTRACT

A double wishbone rear suspension comprises upper and lower control arms of the A-shaped frame type. The pivot ends of the lower control arm pivot about axes which are coaxial and constitute part of a straight line ($L_1$). The straight line ($L_1$) extends forwardly and laterally outwardly and at the same time forwardly and upwardly with respect to the vehicle body. The pivot ends of the upper control arm pivot about axes which are coaxial and constitute part of a straight line ($L_3$). The straight line ($L_3$) is parallel with a longitudinal axis of a vehicle body and located on a horizontal plane. The oscillatory ends of the upper and lower control arms are connected via first and second ball joints to an axle housing. The first ball joint is located rearward of the second ball joint and adjacent and adjacently inward of an upper end portion of a tire of a rear wheel. A rear one of the pivot ends of the lower control arm is located substantially on a straight line extending between the second ball joints for the left and right lower control arms.

5 Claims, 3 Drawing Sheets

DOUBLE WISHBONE REAR SUSPENSION

BACKGROUND OF THE INVENTION

1. Field of the Invention

The present invention relates to a rear suspension for an automotive vehicle, particularly of the double wishbone type.

2. Description of the Prior Art

An example of a prior art double wishbone rear suspension is shown in Japanese Patent Publication Nos. 51-20765 and 52-9889.

A problem of the prior art double wishbone rear suspension is that its upper control arm cannot exert a sufficient resistance against movements of a tire caused by forces working on the tire contact patch in the fore-and-aft and lateral directions thereof.

Another problem is that its camber rigidity is insufficient, i.e., it cannot exert a sufficient resistance to changes of camber since the ball joints for connection of its upper and lower control arms to an axle housing are relatively close to each other.

SUMMARY OF THE INVENTION

In accordance with the present invention, there is provided an improved double wishbone rear suspension which comprises an upper control arm in the form of an A-shaped frame having bifurcated pivot ends for connection with a vehicle body and an oscillating end for support of a tire and a lower control arm in the form of an A-shaped frame having bifurcated pivot ends for connection with the vehicle body and an oscillatory end for support of the tire. The pivot ends of the lower control arm pivot about axes which are coaxial and constitute part of a straight line ($L_1$). The straight line ($L_1$) extends forwardly and laterally outwardly while at the same time forwardly and upwardly of the vehicle body. A rear one of the pivot ends of the lower control arm is located substantially on a straight line extending from the oscillatory end of the lower control arm inwardly of the vehicle body to intersect a longitudinal axis of the vehicle body at right angles. The pivot ends of the upper control arm pivot about axes which are coaxial and constitute part of a straight line ($L_3$). The straight line ($L_3$) is parallel with a longitudinal axis of the vehicle body and located on a horizontal plane. The oscillatory end of the upper control arm is located rearward of the oscillatory end of the lower control arm and adjacent and inward of the upper end portion of the tire.

The above structure is effective for solving the above noted problems inherent in the prior art device.

It is accordingly an object of the present invention to provide an improved double wishbone rear suspension which makes it possible for an upper control arm to exert an increased resistance against movements of a tire caused by forces working on a tire contact patch in the fore-and-aft and lateral directions thereof.

It is another object of the present invention to provide an improved double wishbone rear suspension of the above described character which can increase the camber rigidity.

It a further object of the present invention to provide an improved double wishbone rear suspension of the above described character which can attain a sufficient caster trail.

It is a further object of the present invention to provide an improved double wishbone rear suspension of the above described character which can improve the running stability of the vehicle.

DETAILED DESCRIPTION OF THE PREFERRED EMBODIMENT

Figure 1:
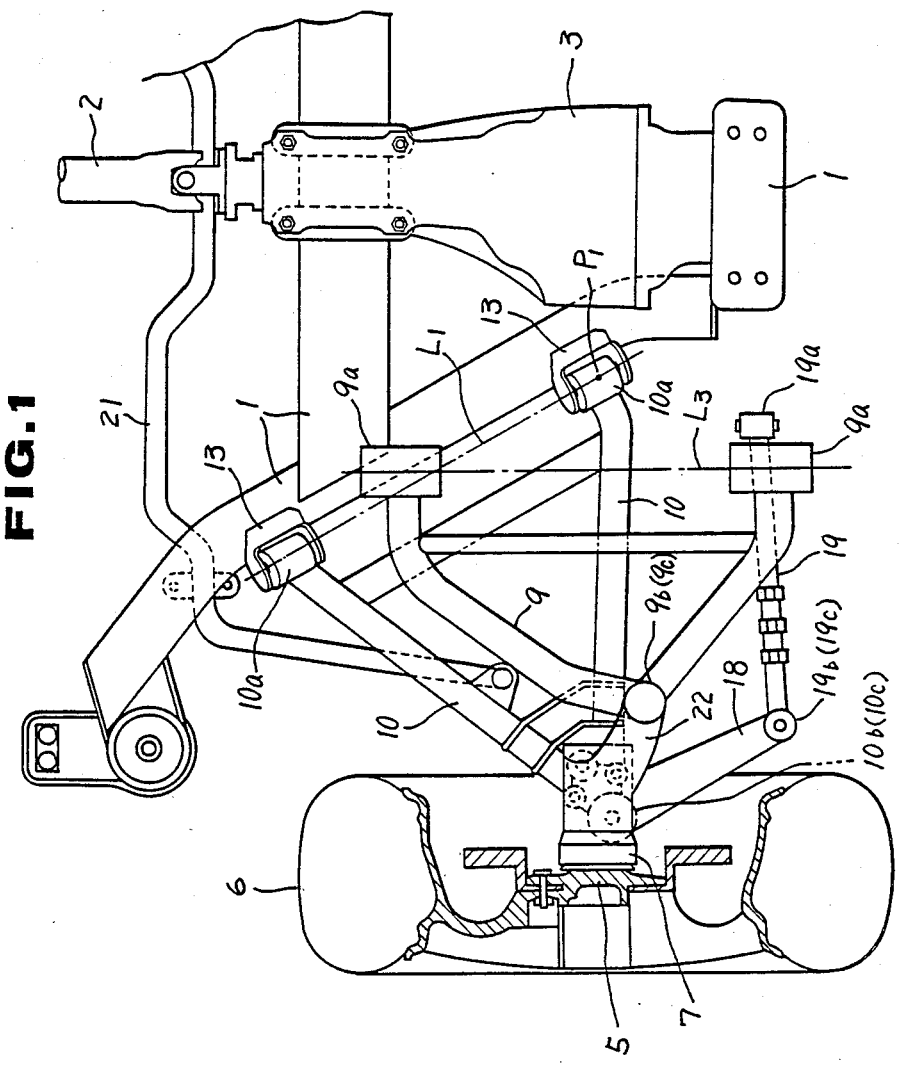
FIG. 1 is a plan view of a double wishbone rear suspension according to an embodiment of the present invention.
Figure 2:
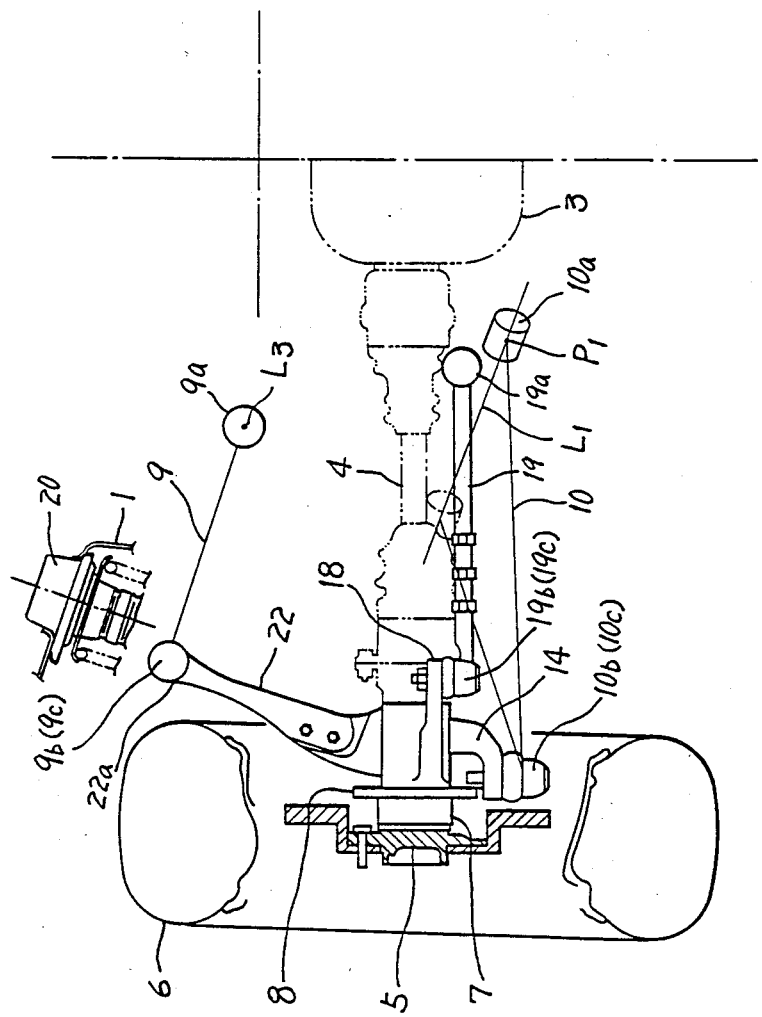
FIG. 2 is a rear elevation of the double wishbone rear suspension of FIG. 1.
Figure 3:
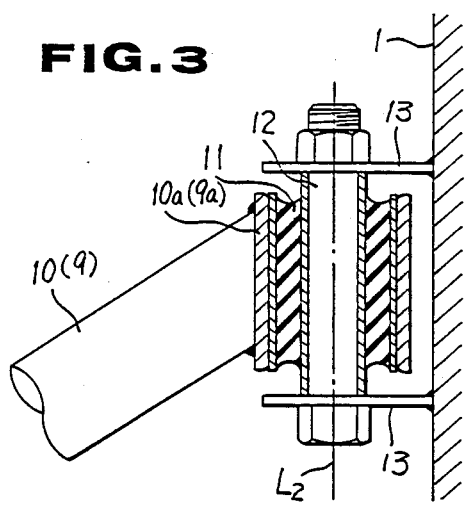
FIG. 3 is a sectional view of a joint between an end of an upper or lower control arm of the double wishbone rear suspension of FIG. 1 and a rear suspension support frame.

Referring to FIGS. 1 to 3, a rear suspension support frame is indicated by reference numeral 1 and is secured to a vehicle body to constitute part thereof. The vehicle body is for use with a rear drive system and has installed on the rear part thereof a propeller shaft 2, differential gear 3, rear drive shaft 4 (refer to FIG. 2), rear axle 5 and rear wheel 6. The rear axle 5 is rotatably supported by an axle housing 7. A brake mounting plate 8 (refer to FIG. 2) is secured to the axle housing 7.

A double wishbone rear suspension of this invention comprises an upper control arm 9 and a lower control arm 10 which are of the so-called A-shaped frame type.

The lower control arm 10 has bifurcated pivot ends 10a and 10a for connection with the rear suspension support frame 1 and an oscillatory end 10b for connection with the axle housing 7 by way of a ball joint 10c. The pivot ends 10a and 10a are each connected to the support frame 1 by means of, as shown in FIG. 3, an elastic or resilient tubular bushing 11, pivot 12 and a bracket 13. The pivot ends 10a and 10a pivot about axes which are coaxial and constitute part of a straight line $L_1$, i.e., the axes $L_2$ of the bushings 11 and 11 between the support frame 1 and the pivot ends 10a and 10a are coaxial and coincident with the straight line $L_1$. The line $L_1$ extends forwardly and laterally outwardly and at the same time forwardly and upwardly of the vehicle body. The rear one of the pivot ends 10a and 10a, i.e., the rear joint P1 between the rear pivot end 10a and the support frame 1 is arranged substantially on the line interconnecting the ball joints 10c for the left and right lower control arms 10 (through the right ball joint and the right lower control arm are not shown).

The upper control arm 9 has bifurcated pivot ends 9a and 9a for connection with the vehicle body in a way similar to the pivot ends 10a and 10a as shown in FIG. 3 and an oscillatory end 9b for connection with the axial housing 7 by means of a ball joint 9c. The pivot ends 9a and 9a pivot about axes which are coaxial and constitute part of a straight line $L_3$ which is parallel to the longitudinal axis of the vehicle body and located on a horizontal plane. The ball joint 9c for the upper control arm 9 is arranged rearwardly of the ball joint 10c for the upper control arm 10 and adjacent and inward of the upper end portion of the tire 6 as seen in FIGS. 1 and 2.

The oscillatory end 10b of the lower control arm 10 is connected via the ball joint 10c to the lower end of a bracket 14 (refer to FIG. 2). The bracket 14 is secured to the axle housing 7 and projects therefrom downwardly with respect to the vehicle body. Reference numeral 21 indicates a torsion bar.

Another bracket 22 is secured to the axle housing 7 and projects therefrom upwardly with respect to the vehicle body. The bracket 22 has an upper end 22a which is located rearwardly of the ball joint 10c and adjacent and inward of the upper end portion of the tire 6. The upper end 22a of the bracket 22 is connected via the ball joint 9c to the oscillatory end 9b of the upper control arm 9.

Another bracket 18 is secured to the axle housing 7 and projects therefrom rearwardly and inwardly with respect to the vehicle body. A lateral rod 19 has an inner end 19a which is attached in a way similar to FIG. 3, i.e., via an elastic bushing, pivot and a bracket to the support frame 1 at a location thereof rearward of the differential gear 3. The outward end 19b of the lateral rod 19 is connected to the rear end of the bracket 18 by means of a ball joint 19c.

A shock strut 20 and a coil spring installed thereon are disposed between the support frame 1 and the axle housing 7.

Figure 4:
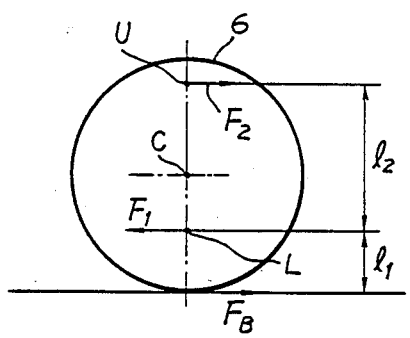
FIGS. 4 to 6 are diagramatic views illustrating forces working on the linkage of the double wishbone rear suspension of FIG. 1 during acceleration or deceleration, engine braking and a condition in which a tire is being subjected to a lateral force, respectively.

Referring to FIG. 4, assuming that "U" indicates an upper tire support point of the double wishbone rear suspension, "L" indicates a lower tire support point and "C" indicates the center of the tire 6, the support points "U" and "L" and the tire contact patch are respectively subjected to forces $F_1$, $F_2$ and $F_B$ during acceleration or deceleration of the vehicle (the illustrated condition is deceleration due to braking). When this is the case, the following equation is given.

$$l_2 F_2 = l_1 F_1$$

$$F_2 + F_B = F_1$$

$$F_2 = \frac{l_1}{l_2} F_1$$

$$F = \frac{l_1 + l_2}{l_2} F_B$$

From this equation, it can be seen that F1 is larger than F2 by $$\frac{l_2}{l_1} \times F_2.$$

Figure 5:
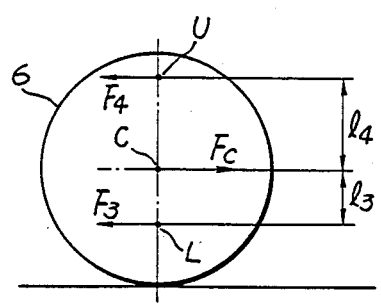

During engine braking, the support points "U" and "$F_B$" and the center of tire "C" are subjected to forces $F_3$, $F_4$ and $F_C$ as shown in FIG. 5.

When this is the case, the following relationships hold.

$$l_3 F_3 = l_4 F_4$$

$$F_C = F_3 + F_4$$

$$F_C = \frac{l_4 + l_3}{l_3} + F_4$$

$$\therefore F = \frac{l_4}{l_3 + l_4} F_C$$

$$F_4 = \frac{l_3}{l_3 + l_4} F_C$$

Figure 6:
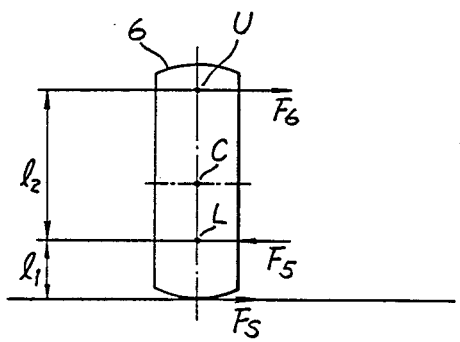

When the vehicle is subjected to a lateral force, the support points "U" and "L" and the tire contact patch are subjected to forces $F_5$, $F_6$, and $F_S$ as shown in FIG. 6 (tire is illustrated as being viewed from the rear of the vehicle).

When this is the case, the following equation is given.

$$F_6 = \frac{l_1}{l_2} F_S$$

$$F_5 = \frac{l_1 + l_2}{l_2} F_S$$

In order to increase the stability of the vehicle during braking, it is necessary that the fore-and-aft force $F_B$ working on the tire contact patch cause such compliance steer that changes the toe setting of the tire 6 to toe-in. To the same end, it is necessary during engine braking that the fore-and-aft force $F_C$ working on the center of the tire 6 as shown in FIG. 5 causes such compliance steer that changes the toe setting of the tire 6 to toe-in. Further, in order to improve the turning ability of the vehicle, it is necessary that the lateral force $F_S$ working on the tire contact patch as shown in FIG. 6 cause compliance steer that changes the toe setting of the tire 6 to toe-in.

As seen from FIGS. 4 and 5, the directions of forces acting on the upper suspension linkage however differ between braking and engine braking. In the double wishbone rear suspension of this invention, the upper suspension linkage is adapted to cause little compliance steer while the lower suspension linkage is adapted to effect such desired compliance steer as described above in response to the forces $F_1$, $F_2$ and $F_5$.

In order to attain a desired camber rigidity, $l_2$ is designed to be sufficiently long when the elastic or resilient bushings utilized are of the same spring constant.

On the other hand, the amount of compliance steer caused in the double wishbone suspension of this invention can be made substantially the same as that in a strut type suspension having a lower control arm by setting $l_2 \gg l_1$ and $l_4 \gg l_3$. Of course, the double wishbone rear suspension of this invention can maintain the change of camber within a narrower range as compared with a strut type suspension and therefore is superior in tire contact.

The caster angle and caster trail are designed so as to change the toe-setting of the tire 6 to toe-in when the vehicle is subjected to a lateral force. To this end, the ball joint 9c for the upper control arm 9 is disposed rearward of the ball joint 10c for the lower control arm 10.

By constructing the upper linkage of the double wishbone rear suspension according to the present invention as described above, the upper ball joint 9c can be made to effect little movement in the lateral direction of the vehicle body and therefore little compliance steer in response to a force working on a tire contact patch in a fore-and-aft or lateral direction thereof.

From the foregoing, it will be understood that the upper control arm in the double wishbone rear suspension of the present invention can exert a larger resistance to movements of the tire caused by the forces working on the tire contact patch in the fore-and-aft and lateral directions thereof as compared with the comparable prior art suspension.

It will be further understood that since the ball joint for the upper control arm is arranged rearward of the ball joint for the lower control arm and adjacent and inward of the upper end portion of the tire in accordance with the present invention, the camber rigidity can be made larger as compared with that of the comparable prior art suspension and at the same time a sufficient caster trail can be attained, thus making it possible to improve the running stability of the vehicle.

What is claimed is:

1. A double wishbone rear suspension for a vehicle comprising:
   an upper control arm in the form of an A-shaped frame having bifurcated pivot ends which are connected to a vehicle body and an oscillatory end;
   a lower control arm in the form of an A-shaped frame having bifurcated pivot ends which are connected to the vehicle body and an oscillatory end; and
   support means for supporting a tire on the oscillatory ends of said upper and lower control arms;
   said pivot ends of said lower control arm pivoting about axes which are coaxial with respect to a straight line (L1);
   said straight line (L1) extending forwardly and laterally outwardly and forwardly and upwardly with respect to the vehicle body;
   a rear one of said pivot ends of said lower control arm being located substantially on a straight line extending from said oscillatory end of said lower control arm inwardly with respect to the vehicle body and intersecting a longitudinal axis of the vehicle body at right angles;
   said pivot ends of said upper control arm pivoting about axes which are coaxial with respect to a straight line (L3);
   said straight line (L3) being parallel with a longitudinal axis of the vehicle body and located on a horizontal plane;
   said oscillatory end of said upper control arm being located rearward of said oscillatory end of said lower control arm and adjacent to and inward of the upper end portion of the tire.

2. A double wishbone rear suspension as set forth in claim 1, further comprising two elastic tubular bushings interposed between said pivot ends of said lower control arm and the vehicle body, said bushings having axes (L2) which are coaxial and coincident with said straight line (L1).

3. A double wishbone rear suspension as set forth in claim 2, wherein said support means comprises:
   an axle housing for rotatably supporting therein an axle for the tire;
   a first bracket having a first end secured to said axle housing and a second end projecting upwardly and rearwardly with respect to the vehicle body and located adjacent to and inward of the upper end portion of the tire;
   a first ball joint interposed between and interconnecting said second end of said first bracket and said oscillatory end of said upper control arm;
   a second bracket having a first end secured to said axle housing and a second end projecting downwardly with respect to the vehicle body; and
   a second ball joint interposed between and interconnecting said second end of said second bracket and said oscillatory end of said lower control arm,
   said first ball joint being located rearward of said second ball joint and adjacent to and inward of the upper end portion of the tire,
   a rear one of said pivot ends of said lower control arm being located substantially on a straight line extending from said second ball joint inwardly with respect to the vehicle body and intersecting the longitudinal axis of the vehicle body at right angles.

4. A double wishbone rear suspension as set forth in claim 3, further comprising a third bracket having a first end secured to said axle housing and a second end projecting rearwardly and inwardly with respect to the vehicle body, a lateral rod having an inner end which is connected to the vehicle body and an outer end, and a third ball joint interposed between and interconnecting said outer end of said lateral rod and said second end of said third bracket.

5. A double wishbone rear suspension for a vehicle comprising:
   an axle housing for support of an axle for a wheel and a tire;
   an upper control arm in the form of an A-shaped frame having bifurcated pivot ends which are connected to a vehicle body and an oscillatory end which is connected to said axle housing;
   a lower control arm in the form of an A-shaped frame having bifurcated pivot ends which are connected to a vehicle body and an oscillatory end which is connected to said axle housing;
   two tubular elastic bushings interposed between said pivot ends of said lower control and the vehicle body;
   a lateral rod which is disposed to the rear of said lower control arm and which is connected between the vehicle body and said axle housing;
   said pivot ends of said lower control arm pivoting about axes which are coaxial with respect to a straight line (L1);
   said bushings having axes (L2) which are coaxial and coincident with said straight line (L1);
   said straight line (L1) extending forwardly and laterally outwardly and forwardly and upwardly with respect to the vehicle body;
   said pivot ends of said upper control arm pivoting about axes which are coaxial with respect to a straight line (L3);
   said straight line (L3) being parallel to a longitudinal axis of the vehicle body and located on a horizontal plane;
   a first ball joint which is connected between said oscillatory end of said upper control arm and said axle housing; and
   a second ball joint which is connected between said oscillatory end of said lower control arm and said axle housing;
   said first ball joint being located rearward of said second ball joint and adjacent to and inward of the upper end of the tire;
   a rear one of said pivot ends of said lower control arm being located substantially on a straight line extending from said second ball joint inwardly with respect to the vehicle body and intersecting the longitudinal axis of the vehicle body at right angles.

* * * * *